Patented Sept. 12, 1933

1,926,555

UNITED STATES PATENT OFFICE 1,926,555

VAT DYESTUFFS OF THE DIBENZANTHRONE SERIES

Paul Nawiasky and Alfred Ehrhardt, Ludwigshafen-on-the-Rhine, Germany, assignors to General Aniline Works, Inc., New York, N. Y., a corporation of Delaware No Drawing. Application July 16, 1930, Serial No. 468,453, and in Germany July 19, 1929

6 Claims. (Cl. 260—61)

The present invention relates to the halogenation of dimethoxydibenzanthrone.

A process for the manufacture and production of vat dyestuffs is described in the U. S. Patent No. 1,505,912 according to which the dyestuffs obtainable by alkylation of oxidation products of dibenzanthrone and its derivatives are converted into dyestuffs containing halogen by treatment with halogens or agents supplying halogens. According to Example 2 of the said patent the halogenation is carried out in nitrobenzene. These dyestuffs give dyeings which are more brilliant and more yellowish than those of the initial materials.

We have now found that chloro-dimethoxydibenzanthrones which are distinguished from the corresponding chloro derivatives obtained according to the process described in the said Patent No. 1,505,912 by their greater purity and the more yellowish shades produced therewith, are obtained by treating pure dimethoxydibenzanthrone which term is meant to comprise the said compound in a state of purity obtainable according to the U. S. Patent No. 1,531,262 in an inert organic solvent with a chlorinating agent in the presence of a metal salt as halogenating catalyst, acid-fixing agents being added if desired. Halogenating catalysts of the aforesaid kind are, for example, iron salts, such as iron chloride, iron fluoride, ferric sulphate, nickel chloride, cobaltous chloride and antimony pentachloride. Particularly good results are obtained when employing sulphuryl chloride as chlorinating agent and nitrobenzene as inert solvent.

The following examples will further illustrate how the said invention may be carried out in practice, but the invention is not restricted to these examples. The parts are by weight.

Example 1

5 parts of pure dimethoxydibenzanthrone, obtainable for example by fractionation from sulphuric acid of the dyestuff obtainable according to Example A of the U. S. Patent No. 1,531,262 are stirred, in a finely powdered condition, with 150 parts of nitrobenzene. 0.5 part of sublimed iron chloride and 5 parts of sulphuryl chloride are then added and the whole is heated to from 80° to 90° C. during the course of 3 hours and is stirred at this temperature for 5 hours. The whole is then allowed to cool, filtered and the reaction product washed with nitrobenzene and freed from adherent solvent in the manner already known. The dyestuff obtained is a yellow green powder the chlorine content of which corresponds to from 2 to 3 atoms of chlorine and which dyes cotton from the vat in brilliant green shades which are considerably superior in purity to those of the dyestuff obtainable according to the examples of the said Patent No. 1,505,912.

Other halogen transferrers such as antimony pentachloride may be employed instead of iron chloride and other chlorinating agents may be employed instead of sulphuryl chloride.

Example 2

5 parts of the same dimethoxydibenzanthrone as used in the foregoing example are finely powdered and stirred with 150 parts of nitrobenzene. 0.5 part of sublimed iron chloride, 5 parts of sulphuryl chloride and 3 parts of quicklime are then added and the procedure described in Example 1 is then followed.

The dyestuff obtained dyes cotton somewhat more yellow shades than the dyestuff obtainable according to Example 1.

Other acid combining agents, as for example magnesium oxide, may be employed instead of quicklime.

What we claim is:—

1. A process of producing chloro-dimethoxydibenzanthrones, which comprises treating pure dimethoxydibenzanthrone in an inert organic solvent with a chlorinating agent in the presence of a metal salt selected from the group consisting of the chlorides and sulphates of iron, cobalt, nickel and antimony as halogenating catalyst.

2. A process of producing chloro-dimethoxydibenzanthrones, which comprises treating pure dimethoxydibenzathrone in nitrobenzene with a chlorinating agent in the presence of a metal salt selected from the group consisting of the chlorides and sulphates of iron, cobalt, nickel and antimony as halogenating catalyst.

3. A process of producing chloro-dimethoxydibenzanthrones, which comprises treating pure dimethoxydibenzanthrone in nitrobenzene with sulphuryl chloride in the presence of a metal salt selected from the group consisting of the chlorides and sulphates of iron, cobalt, nickel and antimony as halogenating catalyst.

4. A process of producing chloro-dimethoxydibenzanthrones, which comprises treating pure dimethoxydibenzanthrone in nitrobenzene with sulphuryl chloride in the presence of a salt selected from iron chloride and ferric sulphate.

5. A process of producing chloro-dimethoxydibenzanthrones, which comprises treating pure dimethoxydibenzanthrone in an inert organic solvent with a chlorinating agent in the presence of a metal salt selected from the group consisting of the chlorides and sulphates of iron, cobalt, nickel and antimony as halogenating catalyst, and an acid-fixing agent.

6. Chloro-dimethoxydibenzanthrones obtainable by treating pure dimethoxydibenzanthrones in an inert organic solvent with a chlorinating agent in the presence of iron chloride as halogenating catalyst which chloro-dimethoxydibenzanthrones produce on cotton from the hydrosulphite vat green dyeings which are substantially more yellowish than the dyeings produced by means of the chloro-dimethoxydibenzanthrones obtained by treating the same dimethoxydibenzanthrones in an inert organic solvent with a chlorinating agent in the absence of a halogenating catalyst.

PAUL NAWIASKY.
ALFRED EHRHARDT.